(12) United States Patent
McIntyre et al.

(10) Patent No.: US 7,747,444 B2
(45) Date of Patent: *Jun. 29, 2010

(54) MULTIPLE SOUND FRAGMENTS PROCESSING AND LOAD BALANCING

(75) Inventors: Joseph Herbert McIntyre, Austin, TX (US); Victor S. Moore, Boynton Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 148 days.

This patent is subject to a terminal disclaimer.

(21) Appl. No.: 12/041,427

(22) Filed: Mar. 3, 2008

(65) Prior Publication Data

US 2008/0147403 A1    Jun. 19, 2008

Related U.S. Application Data

(63) Continuation of application No. 10/164,972, filed on Jun. 6, 2002, now Pat. No. 7,340,392.

(51) Int. Cl.
*G10L 11/00* (2006.01)

(52) U.S. Cl. .................................................. 704/270

(58) Field of Classification Search ................. 704/201, 704/270, 500–504; 700/5, 7; 455/453; 711/118
See application file for complete search history.

(56) References Cited

U.S. PATENT DOCUMENTS

| | | | |
|---|---|---|---|
| 4,214,125 A | 7/1980 | Mozer et al. | |
| 4,227,046 A | 10/1980 | Nakajima et al. | |
| 4,392,018 A | 7/1983 | Fette | |
| 4,481,593 A | 11/1984 | Bahler | |
| 4,618,936 A | 10/1986 | Shiono | |
| 4,700,391 A | 10/1987 | Leslie, Jr. et al. | |
| 4,771,385 A | 9/1988 | Egami et al. | |
| 4,829,429 A | 5/1989 | Komai et al. | |
| 5,027,408 A | 6/1991 | Kroeker et al. | |

(Continued)

FOREIGN PATENT DOCUMENTS

JP    61-151706    7/1986

(Continued)

OTHER PUBLICATIONS

T. Kaneko and Y. Matsuda, Adaptive Length Normalized Dp-Matching Method for Recognition of Connected Words Recognition, IBM Technical Disclosure Bulletin, vol. 29, No. 4, pp. 1811-1815, Sep. 1986.

(Continued)

*Primary Examiner*—Michael N Opsasnick
(74) *Attorney, Agent, or Firm*—Wolf, Greenfield & Sacks, P.C.

(57) ABSTRACT

A method, system and article of manufacture of recognizing a voice command. One embodiment of the invention comprises: receiving a voice input; using the number of sound fragments, determining a number of sound fragments to be processed in a first set of sound fragments; determining whether the first set of sound fragments of the voice input matches with the first set of sound fragments of a voice command; and if the first set of sound fragments matches with the first set of sound fragments of the voice command, then determining whether one or more remaining sound fragments matches with one or more remaining sound fragments of the voice command.

18 Claims, 9 Drawing Sheets

U.S. PATENT DOCUMENTS

| | | | |
|---|---|---|---|
| 5,191,635 | A | 3/1993 | Fujimoto |
| 5,208,897 | A | 5/1993 | Hutchins |
| 5,315,689 | A | 5/1994 | Kanazawa et al. |
| 5,548,647 | A | 8/1996 | Naik et al. |
| 5,704,007 | A | 12/1997 | Cecys |
| 5,839,105 | A | 11/1998 | Ostendorf et al. |
| 5,848,390 | A | 12/1998 | Matsumoto |
| 5,852,729 | A | 12/1998 | Limberis et al. |
| 5,907,825 | A | 5/1999 | Tzirkel-Hancock |
| 5,909,666 | A | 6/1999 | Gould et al. |
| 5,915,236 | A | 6/1999 | Gould et al. |
| 5,960,395 | A | 9/1999 | Tzirkel-Hancock |
| 6,044,343 | A | 3/2000 | Cong et al. |
| 6,061,653 | A | 5/2000 | Fisher et al. |
| 6,098,169 | A | 8/2000 | Ranganathan |
| 6,182,046 | B1 | 1/2001 | Ortega et al. |
| 6,629,075 | B1 | 9/2003 | Schalkwyk |
| 6,757,652 | B1 | 6/2004 | Lund et al. |
| 6,862,570 | B2 * | 3/2005 | Schalkwyk ............. 704/270 |
| 7,340,392 | B2 | 3/2008 | McIntyre et al. |
| 7,423,983 | B1 * | 9/2008 | Li et al. ............. 370/280 |
| 7,426,468 | B2 * | 9/2008 | Coifman et al. ............. 704/275 |
| 2003/0229491 | A1 | 12/2003 | McIntyre et al. |
| 2007/0088551 | A1 | 4/2007 | McIntyre et al. |

FOREIGN PATENT DOCUMENTS

| | | |
|---|---|---|
| JP | 11-052997 | 2/1999 |
| WO | 87/04292 | 7/1987 |

OTHER PUBLICATIONS

N. Osborn, Speech Recognition Enhancement Utilizing Statistical Predication of Letter Sequence, IBM Technical Disclosure Bulletin, vol. 37, No. 12, pp. 641-642, Dec. 1994.

L. Bahl, P. Bonnafoux, M. Carrel-Billiard, H. Crepy and D. Komai-Gorodsky, Improvement in Noise Rejection by Limiting Loops in Markov Models, IBM Technical Disclosure Bulletin, vol. 37, No. 6A, pp. 139-140, Jun. 1994.

L. Bahl, K. Davies, S. De Gennaro, P. De Souza and M. Picheny, Generation of Phonetic Initial Statistics From Fenemic Training, IBM Technical Disclosure Bulletin, vol. 32, No. 10B, pp. 1-4, Mar. 1990.

* cited by examiner

MULTIPLE SOUND FRAGMENTS PROCESSING AND LOAD BALANCING

CROSS-REFERENCE TO RELATED APPLICATIONS

This application is a continuation of U.S. patent application Ser. No. 10/164,972, filed Jun. 6, 2002 now U.S. Pat No 7,340,392, which is herein incorporated by reference in its entirety.

BACKGROUND OF THE INVENTION

The present invention relates to a method and apparatus for recognizing words, and more particularly, voice commands configured to execute certain actions.

Telephone systems have evolved quite considerably in recent times. Today, complex telephone stations connect to sophisticated switching systems to perform a wide range of different telecommunication functions. The typical modern-day telephone systems feature a panoply of different function buttons, including a button to place a conference call, a button to place a party on hold, a button to flash the receiver, a button to select different outside lines or extensions and buttons that can be programmed to automatically dial different frequently called numbers. Clearly, there is a practical limit to the number of buttons that may be included on the telephone device, and that limit is rapidly being approached.

It has been suggested that voice command recognitions systems may provide one solution for facilitating the use of telephone systems. Voice command recognition systems allow a user to input voice commands during a conversation to a telephone system. Upon recognition of the voice commands, certain actions for which the voice commands are configured are invoked. Such actions for which the voice commands are configured include telephone conferencing another person into the conversation, retrieving a telephone number during the conversation, or recording the telephone conversation, etc.

Voice command recognition systems generally process each word from beginning to end, including every syllable or sound fragment in each word. Consequently, voice command recognition systems generally consume a high degree of processing system resources when monitoring a variety of voice commands during a conversation. Due to the high degree of processing system resource consumption, monitoring a variety of voice commands during multiple conversations can prove to be a difficult task for most voice command recognition systems today.

A need therefore exists to provide an improved method and system for recognizing voice commands.

SUMMARY OF THE INVENTION

In one embodiment, the present invention is directed to a method of recognizing a voice command. The method comprises: receiving a voice input; determining a number of sound fragments to be processed in a first set of sound fragments of the voice input; using the number of sound fragments, determining whether the first set of sound fragments of the voice input matches with a first set of sound fragments of a voice command; and if the first set of sound fragments matches with the first set of sound fragments of the voice command, then determining whether one or more remaining sound fragments matches with one or more remaining sound fragments of the voice command.

In another embodiment, the present invention is directed to a method of recognizing a voice command. The method comprises: receiving a voice input; determining, by a load manager, a number of sound fragments to be processed in a first set of sound fragments of the voice input; using the number of sound fragments, determining, by a first processing system, whether the first set of sound fragments of the voice input matches with a first set of sound fragments of a voice command; and if the first set of sound fragments matches with the first set of sound fragments of the voice command, then determining, by a second processing system, whether one or more remaining sound fragments matches with one or more remaining sound fragments of the voice command.

In yet another embodiment, the present invention is directed to a computer readable medium containing a program which, when executed, performs an operation. The operation comprises: receiving a voice input; determining a number of sound fragments to be processed in a first set of sound fragments of the voice input; using the number of sound fragments, determining whether the first set of sound fragments of the voice input matches with a first set of sound fragments of a voice command; and if the first set of sound fragments matches with the first set of sound fragments of the voice command, then determining whether one or more remaining sound fragments matches with one or more remaining sound fragments of the voice command.

In still another embodiment, the present invention is directed to a computer readable medium containing a program which, when executed, performs an operation. The operation comprises: receiving a voice input; determining, by a load manager, a number of sound fragments to be processed in a first set of sound fragments of the voice input; using the number of sound fragments, determining, by a first processing system, whether the first set of sound fragments of the voice input matches with a first set of sound fragments of a voice command; and if the first set of sound fragments matches with the first set of sound fragments of the voice command, then determining, by a second processing system, whether one or more remaining sound fragments matches with one or more remaining sound fragments of the voice command.

In yet still another embodiment, the present invention is directed to a voice command recognition system. The system comprises: a load manager configured for determining a number of sound fragments to be processed in a first set of sound fragments of a voice input. The system further comprises a first processing system comprising: a memory containing a first voice command recognition program; and a processor which, when executing the first voice command recognition program, performs an operation. The operation comprises: receiving the voice input; using the number of sound fragments, determining whether the first set of sound fragments of the voice input matches with a first set of sound fragments of a voice command; and if the first set of sound fragments matches with the first set of sound fragments of the voice command, then forwarding the voice input to a second processing system. The system further comprises the second processing system, which comprises a memory containing a second voice command recognition program; and a processor which, when executing the second voice command recognition program, performs an operation. The operation comprises: receiving the voice input from the first processing system; and determining whether one or more remaining sound fragments matches with one or more remaining sound fragments of the voice command.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention are generally directed to a voice command recognition system. In one embodiment, the voice command recognition system comprises a primary processing system, a secondary processing system and a load manager. The primary processing system is configured to process a first set of sound fragments of the voice input. The number of sound fragments in the first set of sound fragments is determined by the load manager. The load manager is configured to monitor the load of the primary processing system and the secondary processing system. If the load of the secondary processing system exceeds a threshold, then the number of sound fragments to be processed by the primary processing system will increase. In this manner, the load of the secondary processing system is alleviated. If the load of the primary processing system exceeds a threshold, then the number of sound fragments to be processed by the primary processing system will be reduced.

In processing the first set of sound fragments, the primary processing system determines whether the first set of sound fragments matches with a first set of sound fragments of a voice command. If the first set of sound fragments matches with a first set of sound fragments of a voice command, then the primary processing system will transfer the voice input to the secondary processing system for further processing. If the first set of sound fragments does not match with a first set of sound fragments of a voice command, then the primary processing system will discard the voice input and processes the next voice input.

Upon receipt of the voice input from the primary processing system, the secondary processing system determines whether the remaining sound fragments matches with the remaining sound fragments of the voice command. In one embodiment, the secondary processing system retrieves a total number of sound fragments from a database and determines the remaining sound fragments of the voice command. If the remaining sound fragments match with the remaining sound fragments of the voice command, then the secondary processing system sends a signal to an action generator to invoke an action for which the voice command is configured. If the remaining sound fragments does not match with the remaining sound fragments of the voice command, then the secondary processing system will discard the voice input and waits for the next voice input to be processed from the primary processing system.

By processing a set of sound fragments at a time, as opposed to the whole voice input, the voice command recognition system of the present invention can quickly abandon processing the voice input prior to the whole voice input being uttered, which consequently conserves processing system resources. The use of the load manager in accordance with an embodiment of the invention further optimizes the efficiency of system resource utilization. In this manner, embodiments of the present invention increase the scalability of voice command recognition systems.

One embodiment of the invention is implemented as a program product for use with a computer system such as, for example, the voice command recognition system 100 shown in FIG. 1A and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1A:
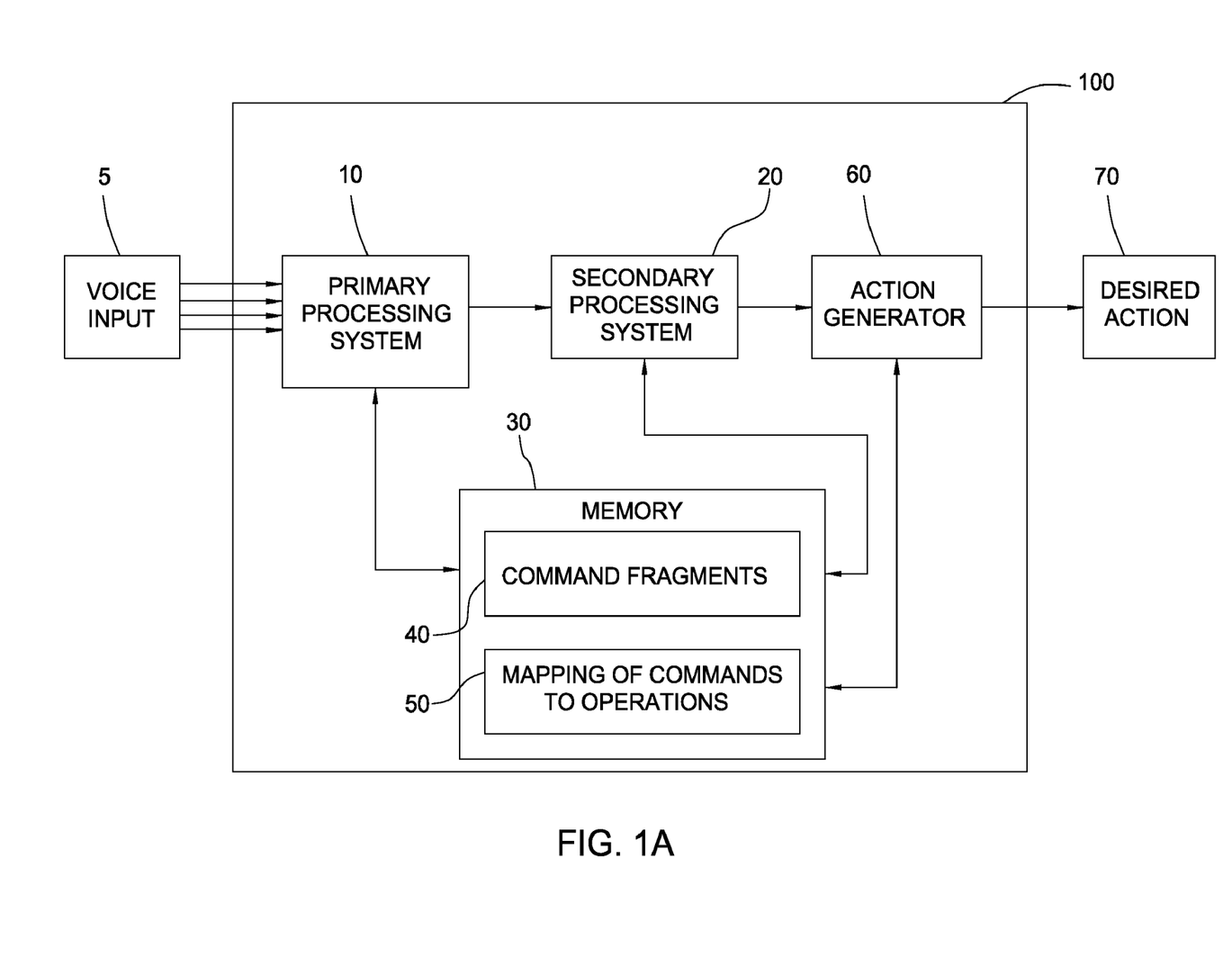
FIG. 1A is a block diagram of a voice command recognition system in accordance with an embodiment of the present invention.

Referring now to FIG. 1A, a block diagram of a voice command recognition system 100 in accordance with an embodiment of the present invention is illustrated. The voice command recognition system 100 includes a primary processing system 10, a secondary processing system 20 and an action generator 60. As illustrated in FIG. 1A, a voice input 5 is received by the primary processing system 10. Voice input 5 is generally considered the audio data that is input to the voice command recognition system 100 and is intended to represent any type of audio data. In one embodiment, the voice input 5 comprises one or more voice channels. Each voice channel is generally considered a digital signal representation of one conversation, which contains many words, spoken by one or more human beings or machines. In another embodiment, the voice input 5 undergoes an analog to digital conversion prior to being received by the primary processing system 10. If, however, the voice input 5 is digital, then no analog-to-digital conversion is needed.

In accordance with an embodiment of the present invention, the primary processing system 10 is configured to receive the voice input 5, monitor only the first sound fragment or fragment of each word and transfer to the secondary processing system 20 for further processing only the words whose first sound fragment matches with a first sound fragment of a voice command. A sound fragment may generally be considered a time-based fragment of a word. The secondary processing system 20, on the other hand, is configured to process the remaining sound fragments or fragments of the word received from the primary processing system 10 to determine if the word is a voice command. If the word is a voice command, then the action generator 60 is configured to determine which action is to be invoked in response to the voice command and invokes a desired action 70. Details of this process will be discussed in the following paragraphs.

The voice command recognition system 100 further includes a memory 30 comprising a list 40 of voice command fragments and a mapping 50 of each voice command to a particular desired action. The voice command fragments list 40 is configured to be used by the primary processing system 10 and the secondary processing system 20 in analyzing and processing each word. Details of the voice command fragments list 40 will be discussed in the following paragraphs. The voice command to action mapping 50 generally comprises a list of voice commands and a particular action that each voice command is configured to invoke. The voice command to action mapping 50 is used by the action generator 60 to determine which action is correlated with the voice command. Action generators, such as the action generator 60, are well known to those skilled in the art, and thus will not be discussed further except as it pertains to the present invention.

Figure 1B:
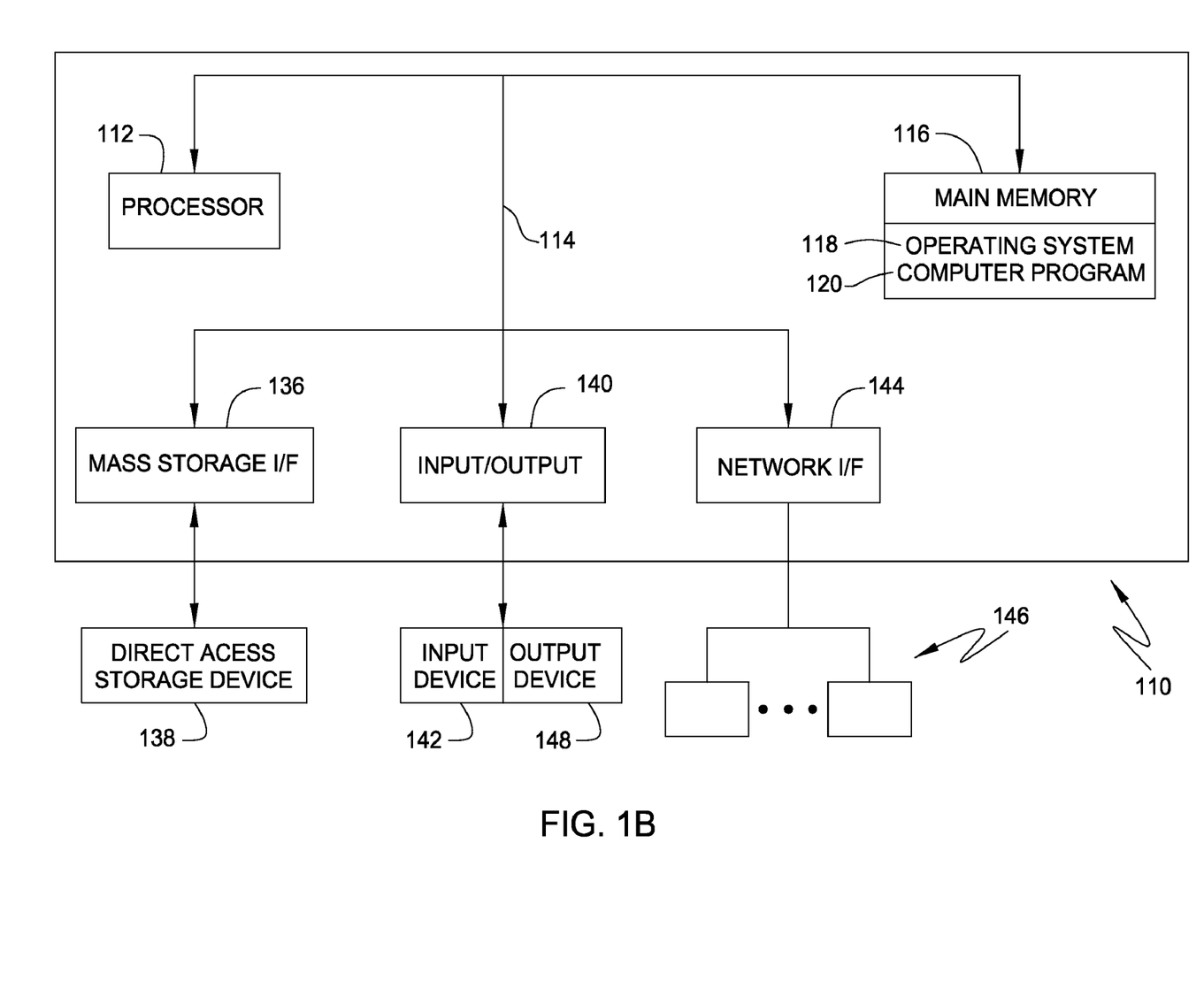
FIG. 1B is a high-level diagram of one embodiment of a computer system in accordance with an embodiment of the present invention.

In accordance with an embodiment of the present invention, the primary processing system 10 and the secondary processing system 20 may be any computer system, such as computer system 110 shown in FIG. 1B. For purposes of the invention 1 the computer system 110 may represent any type of computer, computer system or other programmable electronic device, including a client computer, a server computer, a portable computer, an embedded controller, etc. The computer system 110 may be a standalone device or networked into a larger system. In one embodiment, the computer system 110 is an AS/400 available from International Business Machines of Armonk, N.Y.

The computer system 110 generally includes at least one processor 112, which obtains instructions and data via a bus 114 from a main memory 116. The computer system 110 is adapted to support the methods, apparatus and article of manufacture of the invention.

The computer system 110 can be connected to a number of operators and peripheral systems. Illustratively, the computer system 110 includes a storage device 138, input devices 142, output devices 148, and a plurality of networked devices 146. Each of the peripheral systems is operably connected to the computer system 110 via interfaces 136, 140 and 144. In one embodiment, the storage device 138 is DASD (Direct Access Storage Device), although it could be any other storage such as floppy disc drives or optical storage. Even though the storage device 138 is shown as a single unit, it could be any combination of fixed and/or removable storage devices, such as fixed disc drives, floppy disc drives, tape drives, removable memory cards, or optical storage. The input devices 142 can be any device to give input to the computer system 110. For example, a keyboard, keypad, light pen, touch screen, button, mouse, track ball, or speech recognition unit could be used. The output devices 148 include any conventional display screen and, although shown separately from the input devices 142, the output devices 148 and the input devices 142 could be combined. For example, a display screen with an integrated touch screen, and a display with an integrated keyboard, or a speech recognition unit combined with a text speech converter could be used.

The main memory 116 can be one or a combination of memory devices, including Random Access Memory, non-volatile or backup memory, (e.g., programmable or Flash memories, read-only memories, etc.). In addition, the main memory 116 may be considered to include memory physically located elsewhere in a computer system 110, for example, any storage capacity used as virtual memory or stored on a mass storage device or on another computer coupled to the computer system 110 via the bus 114. While the main memory 116 is shown as a single entity, it should be understood that main memory 116 may in fact comprise a plurality of modules, and that the main memory 116 may exist at multiple levels, from high speed registers and caches to lower speed but larger DRAM chips.

In one embodiment, the main memory 116 includes an operating system 118 and a computer program 120 to operate one or more embodiments of the present invention. The operating system 118 is the software used for managing the operation of the computer system 110. Examples of the operating system 118 include IBM OS/400, UNIX, Microsoft Windows, and the like. Details of the computer program 120 with respect to the primary processing system 10 and the secondary processing system 20 will be discussed with reference to FIGS. 3 and 4.

Figure 2:
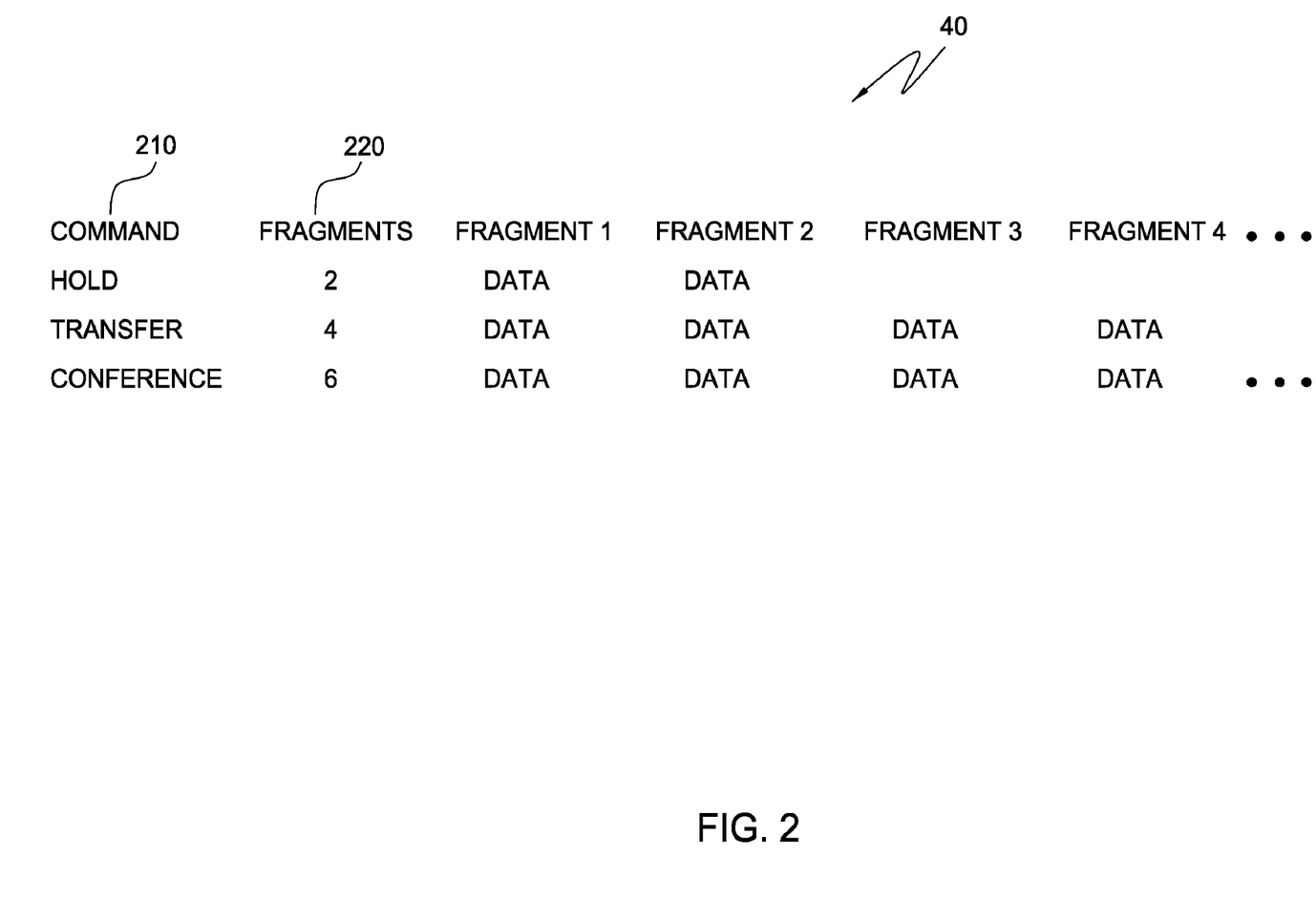
FIG. 2 illustrates a list of voice command fragments or sound fragments in accordance with an embodiment of the present invention.

Referring now to FIG. 2, an embodiment of the voice command fragments list 40 is illustrated. The voice command fragments list 40 comprises a list of voice commands 210, the total number of fragments 220 each voice command contains and each individual fragment (e.g., Fragment 1, Fragment 2, etc.). In one embodiment, the total number of fragments 220 is generally determined by the amount of time it takes to pronounce the voice command. Each fragment can therefore be generally considered a sound fragment. And, a sound fragment is generally considered a time-based fragment of a word. For instance, the voice command "hold" has two sound fragments, the voice command "transfer" has four sound fragments, and the voice command "conference" has six sound fragments. Accordingly, the longer the voice command, the more sound fragments it has. The data under each fragment (e.g., Fragment 1) represents the sound fragment for that particular fragment. Each of these sound fragments is used in determining whether each word received by the voice command recognition system 100 is a voice command. In one embodiment, the primary processing system 10 uses only the first sound fragment (e.g., data under Fragment 1 for "transfer") of each voice command to determine whether the first sound fragment of each word matches with the first sound fragment of each voice command. In another embodiment, the secondary processing system 20 uses the remaining sound fragments (e.g., data under Fragment 2 and Fragment 3 for "transfer") to determine whether the remaining sound fragments of the word received from the primary processing system 10 matches with the remaining sound fragments of the voice command. Details of various uses of the voice command fragments list 40 will be discussed in the following paragraphs.

Figure 3:
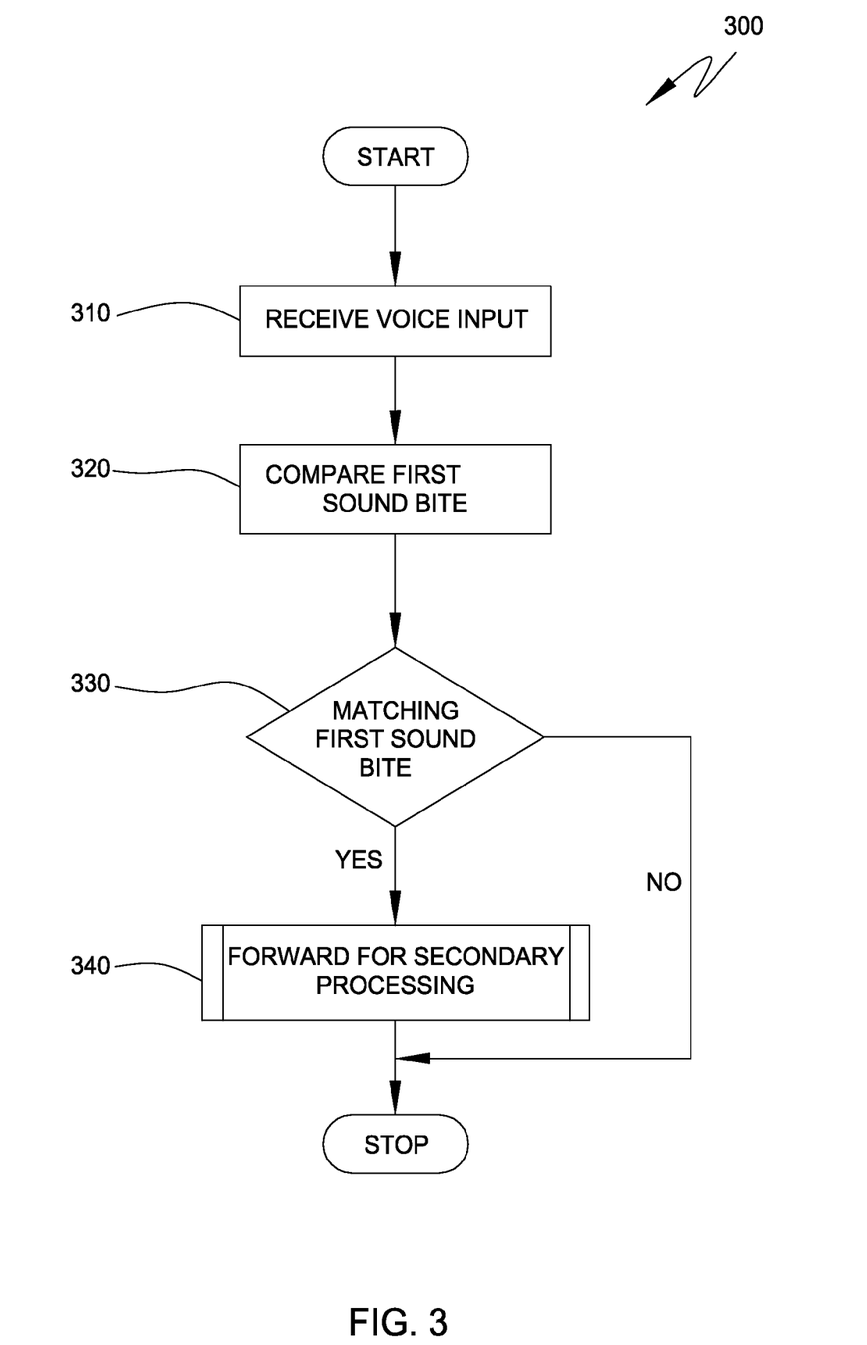
FIG. 3 is a process for processing each word by the primary processing system in accordance with an embodiment of the present invention.

Referring now to FIG. 3, a process 300 for processing each word by the primary processing system 10 in accordance with an embodiment of the present invention is illustrated. At step 310, as the primary processing system 10 receives a voice input 5, the primary processing system 10 processes only the first sound fragment of the voice input 5. In one embodiment, the primary processing system 10 processes the voice input 5 one word at a time. At step 320-330, the primary processing system 10 compares the first sound fragment with the first sound fragment of each voice command stored in the voice command fragments list 40. If the first sound fragment matches with the first sound fragment of a voice command, then the voice input is forwarded to the secondary processing system 20 for further processing (step 340). If the first sound fragment does not match with the first sound fragment of any voice command, then the primary processing system 10 discards the voice input 5 and processes the next voice input 5. The primary processing system 10 is configured to continuously process words from the voice input 5. The process 300 may be embodied as a computer program, such as the computer program 120.

Figure 4:
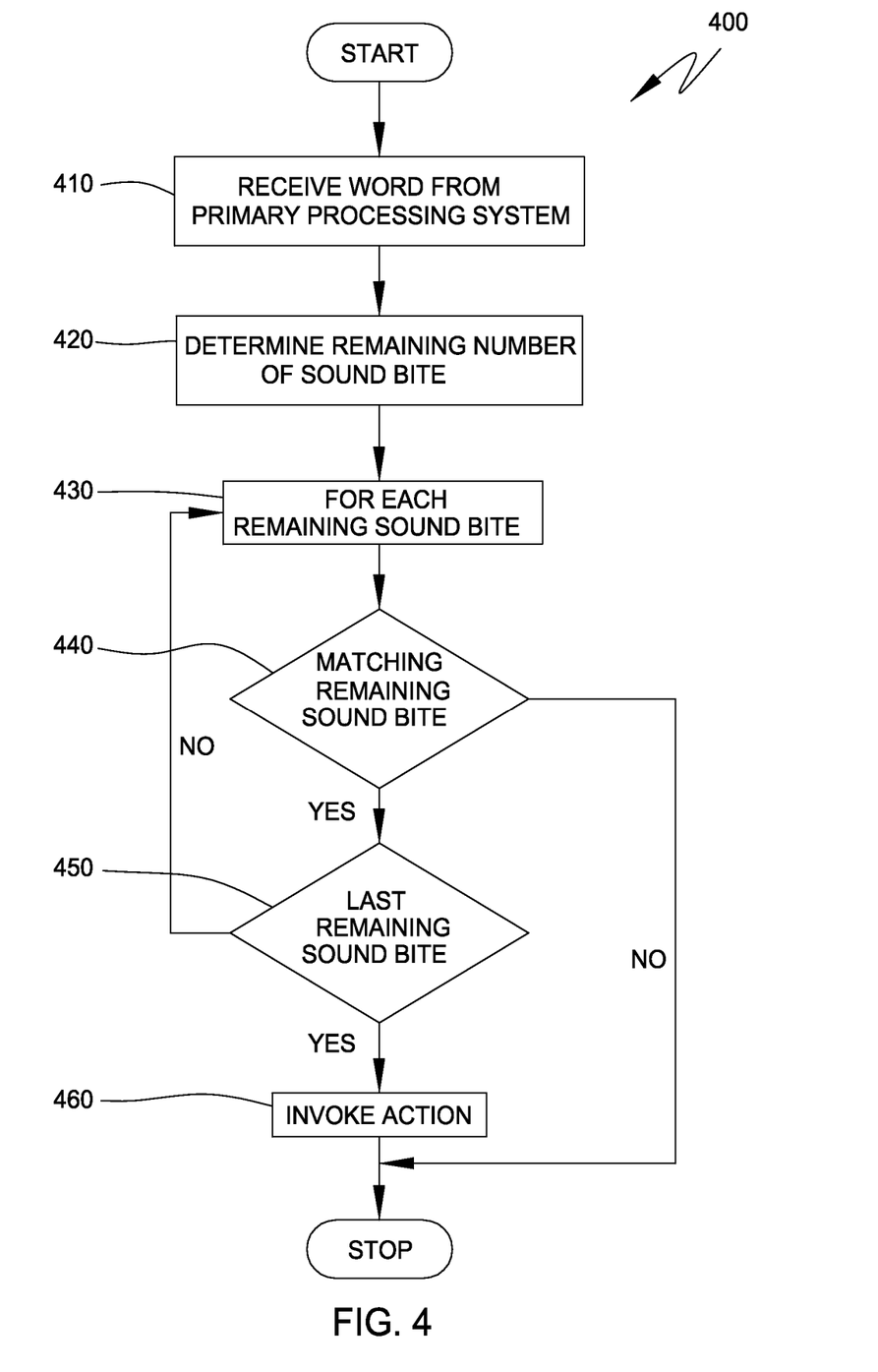
FIG. 4 illustrates process for processing the remaining sound fragments by the second processing system in accordance with an embodiment of the present invention.

Referring now to FIG. 4, one embodiment of a process 400 for processing the remaining sound fragments of the word by the secondary processing system 20 in accordance with step 340 is illustrated. At step 410, the word to be processed is received (from the primary processing system 10) by the secondary processing system 20. At step 420, the secondary processing system 20 determines the remaining number of sound fragments to be processed. In one embodiment, the secondary processing system 20 retrieves the total number of fragments (or sound fragments) 220 for the voice command to determine the remaining number of sound fragments to be processed. The secondary processing system 20 may retrieve the total number of fragments (or sound fragments) 220 from the voice command fragments list 40. At steps 430-450, the secondary processing system 20 compares the remaining sound fragments of the word with the remaining sound fragments of the voice command. If the remaining sound fragments match the remaining sound fragments of the voice command, then the voice command recognition system 100 invokes the desired action 70 for which the voice command is configured (step 460). In one embodiment, the desired action 70 is invoked by the action generator 60. On the other hand, if the remaining sound fragments of the word do not match with the remaining sound fragments of the voice command, then the word is discarded and the secondary processing system 20 waits for the next word to be processed. The process 400 may be embodied as a computer program, such as the computer program 120.

Multiple Sound Fragments Processing and Load Balancing

Figure 5:
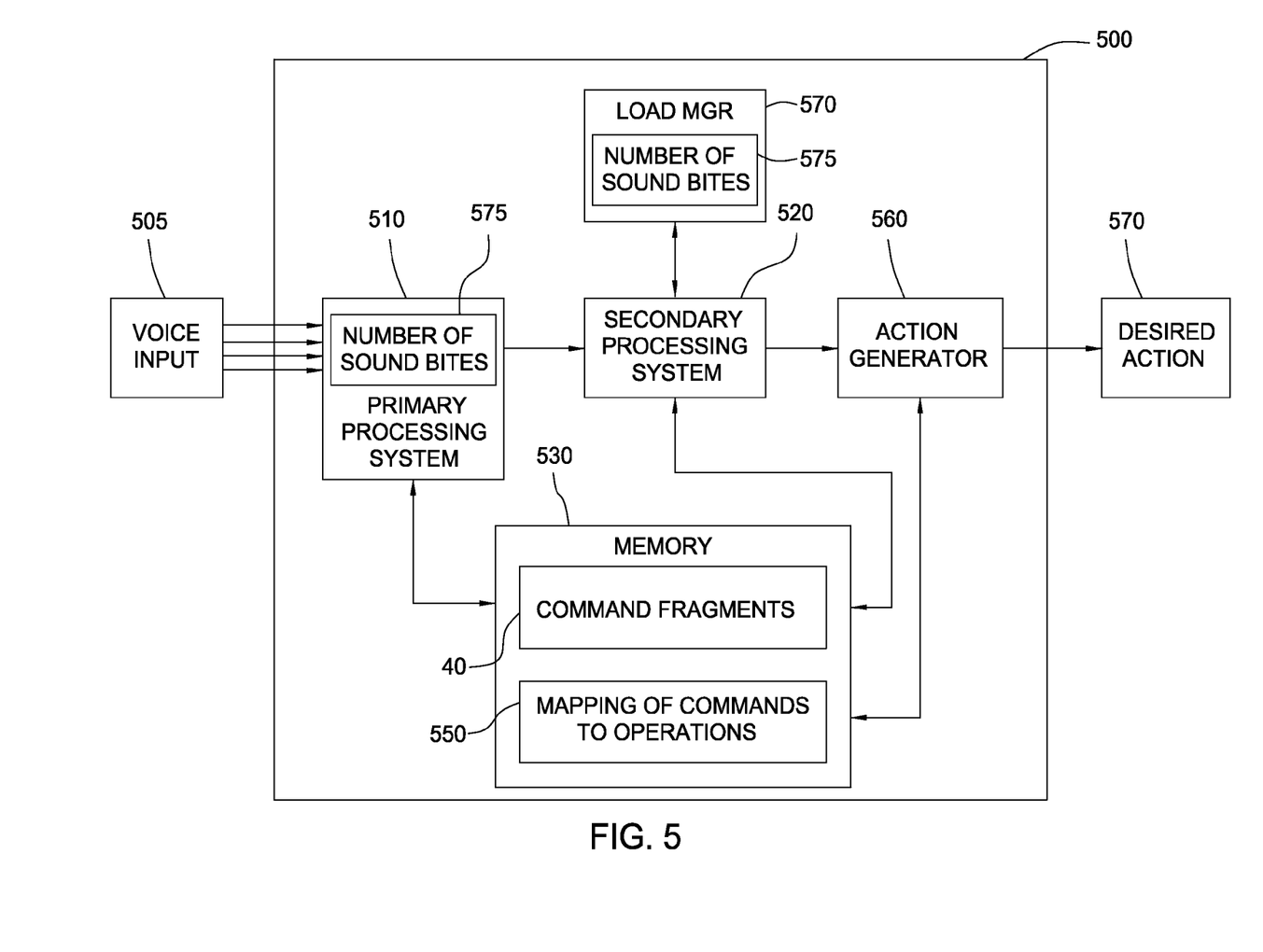
FIG. 5 is a block diagram of a voice command recognition system In accordance with an embodiment of the present invention.

Referring now to FIG. 5, a block diagram of a voice command recognition system 500 in accordance with another embodiment of the present invention is illustrated. The voice command recognition system 500 includes a primary processing system 510, a secondary processing system 520, an action generator 560 and a load manager 570. As illustrated in FIG. 5, a voice input 505 is received by the primary processing system 510. Voice input 505 is generally considered the audio data that is input to the voice command recognition system 500 and is intended to represent any type of audio data. The voice input 505 may be comprised of one or more voice channels. Each voice channel is generally considered a digital signal representation of one conversation, which contains many words, spoken by one or more individuals. In another embodiment, the voice input 505 undergoes an analog to digital conversion prior to being received by the primary processing system 510. If, however, the voice input 505 is digital, then no analog-to-digital conversion is needed.

In accordance with an embodiment of the present invention, the primary processing system 510 is configured to receive the voice input 505, monitor a first set of sound bites or fragments of each word and transfer to the secondary processing system 520 for further processing only those words whose first set of sound bites matches with a first set of sound bites of a voice command. The secondary processing system 520, on the other hand, is configured to process the remaining sound bites or fragments of the word received from the primary processing system 510 to determine if the word is a voice command. If the word is a voice command, then the action generator 560 is configured to determine which action to be invoked in response to the voice command and invokes a desired action 570. Details of this process will be discussed in the following paragraphs.

In this embodiment, the number of sound bites 575 in the first set of sound bites is determined by the load manager 570. The load manager 570 is configured to monitor the processing loads (or CPU utilization) of the primary processing system 510 and the secondary processing system 520. If the load manager 570 determines that the load of the secondary processing system 520 exceeds a threshold, then the number of sound bites 575 in the first set of sound bites to be processed by the primary processing system 510 is increased. For example, instead of monitoring only the first sound bite of each word, the primary processing system 510 monitors the first three sound bites of each word. As a result, the remaining sound bites to be processed by the secondary processing system 520 are reduced. In this manner, the load of the secondary processing system 520 is alleviated. On the other hand, if the load manager 570 determines that the load of the primary processing system 510 exceeds a threshold, then the first set of sound bites to be processed by the primary processing system 510 is reduced accordingly. For example, the first set of sound bites to be processed by the primary processing system 510 may be reduced from the first three sound bites to only the first sound bite. At minimum, the primary processing system 510 processes the first sound bite. In one embodiment, the first set of sound bites to be processed by the primary processing system 510 is determined by the number of voice commands to be matched by the primary processing system 510. That is, the higher the number of voice commands to be matched by the primary processing system 510, the fewer sound bites the first set of sound bites contains. Conversely, the lower the number of voice commands to be matched, the more sound bites the first set of sound bites contains.

The voice command recognition system 500 further comprises a memory 530 comprising a list 40 of voice command fragments and a mapping 550 of each voice command to a particular desired action. The voice command fragments list 40 is configured to be used by the primary processing system 510 and the secondary processing system 520 in analyzing and processing each word. The voice command to action mapping 550 generally comprises a list of voice commands and a particular action that each voice command is configured to invoke. The voice command to action mapping 550 is used by the action generator 560 to determine which action is correlated with the voice command. Action generators, such as the action generator 560, are well known to those skilled in the art, and thus will not be discussed further except as it pertains to the present invention.

In accordance with an embodiment of the present invention, the primary processing system 510, the secondary processing system 520 and the load manager 570 may be any computer system, such as computer system 110 shown in FIG. 1B and discussed with reference thereto.

Figure 6:
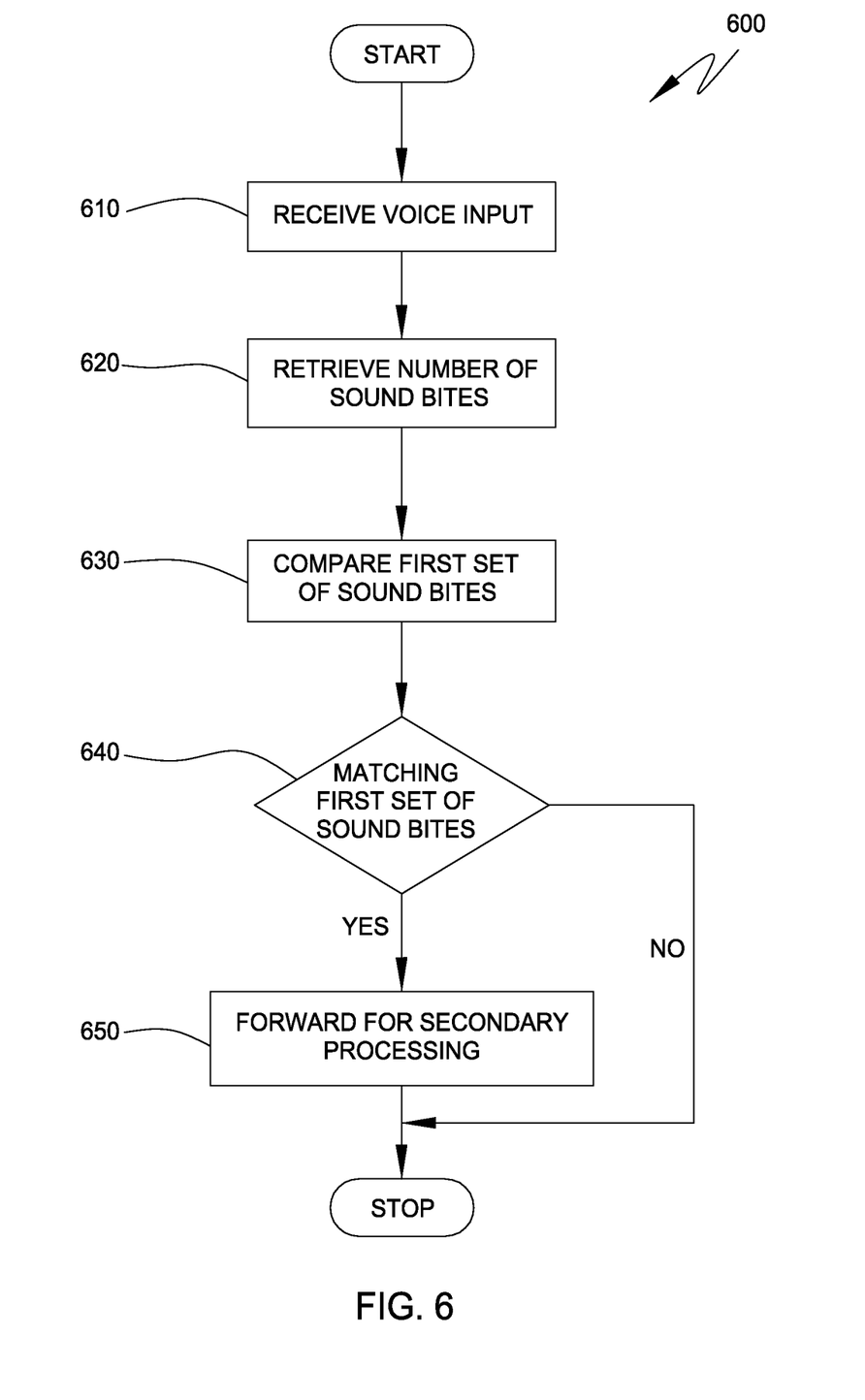
FIG. 6 is a process for processing each word by the primary processing system in accordance with an embodiment of the present invention.

Referring now to FIG. 6, a process 600 for processing each word by the primary processing system 510 in accordance with an embodiment of the present invention is illustrated. At step 610, the primary processing system 510 receives the voice input 505. As the primary processing system 510 receives a word from the voice input 505, the primary processing system 510 processes only the first set of fragments or sound bites of the word. For example, the primary processing system 510 may process the first two sound bites of the word or the first three sound bites of the word. In one embodiment, the number of sound bites 575 to be processed is determined by the load manager 570. As previously mentioned, the load manager 570 determines the number of sound bites 575 to be processed by the primary processing system 510 based on the loads of the primary processing system 510 and the secondary processing system 520 at the time. Consequently, before the primary processing system 510 processes the first set of sound bites of the word, the primary processing system 510 retrieves the number of sound bites 575, which indicates the number of sound bites to be processed in the first set of sound bites (step 620). At steps 630-650, using the number of sound bites 575, the primary processing system 510 compares the first set of sound bites of the word with the first set of sound bites of each voice command stored in the voice command fragments list 40. If the first set of sound bites of the word matches with the first set of sound bites of a voice command, then the word is forwarded to the secondary processing system 520 for further processing. If the first set of sound bites of the word does not match with the first set of sound bites of any voice command, then the word is discarded and the primary processing system 510 processes the next word from the voice input 505. The primary processing system 510 is configured to continuously receive words from the voice input 505. The process 600 may be embodied as a computer program, such as the computer program 120.

Figure 7:
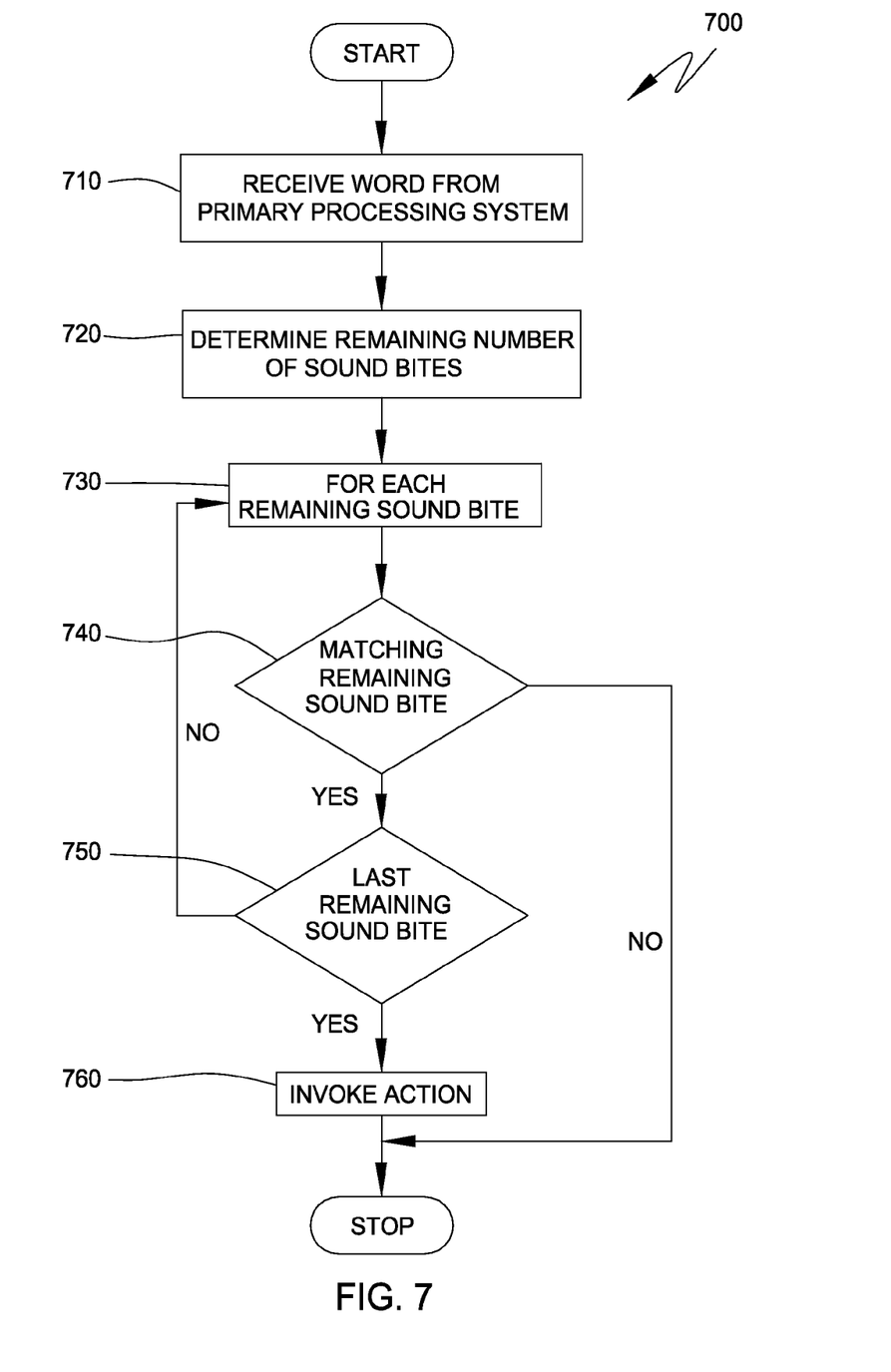
FIG. 7 illustrates a process for processing the remaining sound fragments by the secondary processing system in accordance with an embodiment of the present invention.

Referring now to FIG. 7, a process 700 for processing the remaining sound bites of the word by the secondary processing system 520 in accordance with an embodiment of the present invention is illustrated. At step 710, the word to be processed is received (from the primary processing system 510) by the secondary processing system 520. At step 720, the secondary processing system 520 determines the remaining number of sound bites to be processed. In one embodiment, the secondary processing system 520 retrieves the total number of fragments (or sound bites) 220 for the voice command to determine the remaining number of sound bites to be processed. The secondary processing system 520 may retrieve the total number of fragments (or sound bites) 220 from the voice command fragments list 40. At steps 730-750, the secondary processing system 520 compares the remaining sound bites of the word with the remaining sound bites of the voice command. If the remaining sound bites of the word match the remaining sound bites of the voice command, then the voice command recognition system 100 invokes the desired action 570 for which the voice command is configured (step 760). In one embodiment, the desired action 570 is invoked by the action generator 560.

Figure 8:
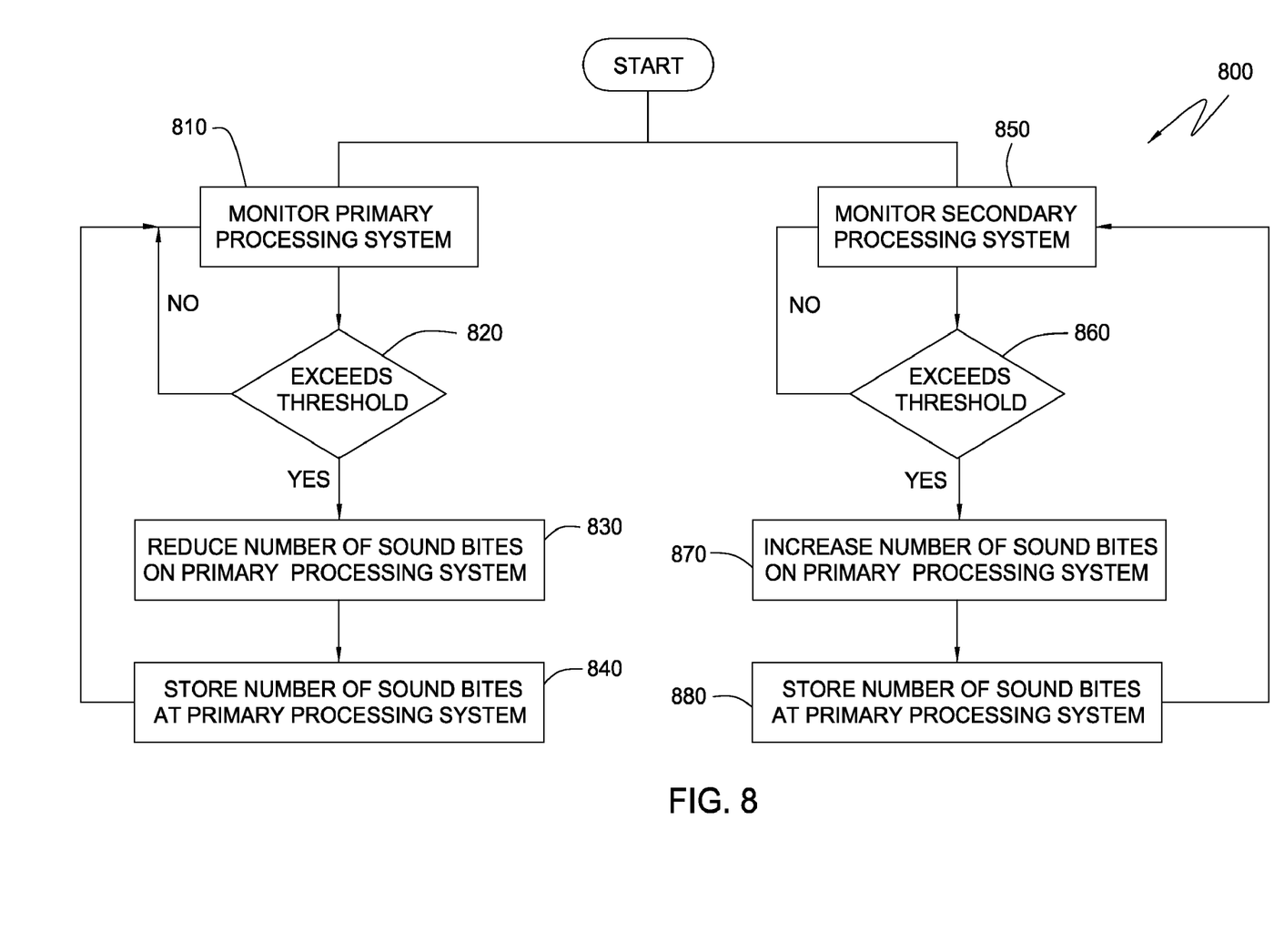
FIG. 8 illustrates a process for managing the number of sound fragments to be processed by the primary processing system in the first set of sound fragments in accordance with an embodiment of the present invention.

Referring now to FIG. 8, a process 800 for managing the number of sound bites 575 for the primary processing system 510 in accordance with an embodiment of the present invention is illustrated. As previously mentioned, the number of sound bites 575 indicates the number of sound bites the primary processing system 510 processes in the first set of sound bites. At step 810, the load manager 570 monitors the load of the primary processing system 510. At step 820, a determination is made as to whether the load of the primary processing system 510 exceeds a threshold. In one embodiment, the threshold is predefined. If the load of the primary processing system 510 does not exceed the threshold, then processing returns to step 810. On the other hand, if the load of the primary processing system 510 exceeds the threshold, then the number of sound bites 575 is reduced (step 830). In one embodiment, the minimum number of number of sound bites 575 is one, which correlates to the first sound bite. At step 840, a copy of the number of sound bites 575 is stored in the primary processing system 510, such as the memory 116. Processing then returns to step 810.

In addition to monitoring the load of the primary processing system 510, the load manager 570 also monitors the load of the secondary processing system 520 (step 850). At step 860, a determination is made as to whether the load of the secondary processing system 520 exceeds a threshold. In one embodiment, the threshold is predefined. If the load of the secondary processing system 520 does not exceed the threshold, then processing returns to step 850. On the other hand, if the load of the secondary processing system 520 exceeds the threshold, then the number of sound bites 575 is increased (step 870). By increasing the number of sound bites processed by the primary processing system 510, the remaining number of sound bites processed by the secondary processing system 520 is reduced. Further, as a result of the primary processing system 510 processing more sound bites, more words will be discarded by the primary processing system 510, thereby reducing the number of words to be forwarded to the secondary processing system 520 for further processing. In this manner, the load of the secondary processing system 520 is alleviated. At step 880, a copy of the number of sound bites 575 is stored in the primary processing system 510, such as the memory 116. Processing then returns to step 850.

While the invention has been shown and described with reference to particular embodiments thereof, it will be understood by those skilled in the art that the foregoing and other changes in form and detail may be made therein without departing from the spirit and scope of the invention.

What is claimed is:

1. A computer readable storage medium encoded with computer executable instructions which, when executed by a processor, cause the processor to perform an operation, comprising:
    receiving a voice input;
    determining a number of sound fragments to be processed in a first set of sound fragments of the voice input by:
        monitoring a load of a first processing system and a load of a second processing system, and determining the number of sound fragments based on the load of the first processing system and the load of the second processing system, wherein the number of sound fragments is increased when the load of the second processing system exceeds a predefined threshold;

using the number of sound fragments, determining, by the first processing system, whether the first set of sound fragments of the voice input matches with a set of sound fragments of a voice command; and if the first set of sound fragments matches with the set of sound fragments of the voice command, then determining, by the second processing system, whether one or more remaining sound fragments matches with one or more remaining sound fragments of the voice command.

2. The computer readable storage medium of claim 1, wherein the number of sound fragments is determined by a load manager.

3. The computer readable storage medium of claim 1, wherein the number of sound fragments is reduced when the load of the first processing system exceeds a predefined threshold.

4. The computer readable storage medium of claim 1, wherein the operation further comprises if the one or more remaining sound fragments matches with the one or more remaining sound fragments of the voice command, then invoking an action for which the voice command is configured.

5. The computer readable storage medium of claim 1, wherein determining whether the one or more remaining sound fragments matches with the one or more remaining sound fragments of the voice command comprises:
   retrieving a total number of sound fragments in the voice command; and
   determining the remaining sound fragments from the total number of sound fragments.

6. The computer readable storage medium of claim 1, wherein the operation further comprises if the one or more remaining sound fragments does not match with the one or more remaining sound fragments of the voice command, then discarding the voice input.

7. The computer readable storage medium of claim 1, wherein the operation further comprises:
   if the one or more remaining sound fragments matches with the one or more remaining sound fragments of the voice command, then invoking an action for which the voice command is configured; and
   if the one or more remaining sound fragments do not match with the one or more remaining sound fragments of the voice command, then discarding the voice input.

8. The computer readable storage medium of claim 1, wherein the operation further comprises if the first set of sound fragments does not match with the set of sound fragments of the voice command, then discarding the voice input and processing a subsequent voice input.

9. The computer readable storage medium of claim 1, wherein the operation further comprises:
   if the first set of sound fragments does not match with the set of sound fragments of the voice command, then discarding the voice input and processing a subsequent voice input;
   if the one or more remaining sound fragments matches with the one or more remaining sound fragments of the voice command, then invoking an action for which the voice command is configured; and
   if the one or more remaining sound fragments do not match with the one or more remaining sound fragments of the voice command, then discarding the voice input.

10. A computer readable storage medium encoded with computer executable instructions which, when executed by a processor, cause the processor to perform an operation, comprising:
   receiving a voice input;
   determining, by a load manager, a number of sound fragments to be processed in a first set of sound fragments of the voice input by:
   monitoring a load of a first processing system and a load of a second processing system, and
   determining the number of sound fragments based on the load of the first processing system and the load of the second processing system, wherein the number of sound fragments is increased when the load of the second processing system exceeds a predefined threshold;
   using the number of sound fragments, determining, by the first processing system, whether the first set of sound fragments of the voice input matches with a set of sound fragments of a voice command; and
   if the first set of sound fragments matches with the set of sound fragments of the voice command, then determining, by the second processing system, whether one or more remaining sound fragments matches with one or more remaining sound fragments of the voice command.

11. The computer readable storage medium of claim 10, wherein the number of sound fragments depends on a load of the first processing system and a load of the second processing system.

12. The computer readable storage medium of claim 10, wherein determining, by the load manager, the number of sound fragments to be processed in the first set of sound fragments comprises:
   monitoring a load of the first processing system and a load of the second processing system; and
   determining the number of sound fragments based on the load of the first processing system and the load of the second processing system.

13. The computer readable storage medium of claim 10, wherein the operation further comprises if the one or more remaining sound fragments matches with the one or more remaining sound fragments of the voice command, then invoking an action for which the voice command is configured.

14. A voice command recognition system, comprising:
   a load manager configured for determining a number of sound fragments to be processed in a first set of sound fragments of a voice input wherein the number of sound fragments depends on a load of a first processing system and a load of a second processing system, and wherein the number of sound fragments is increased when the load of the second processing system exceeds a predefined threshold;
   the first processing system comprising:
   a memory containing a first voice command recognition program; and
   a processor which, when executing the first voice command recognition program, performs an operation comprising:
   receiving the voice input;
   using the number of sound fragments, determining whether the set of sound fragments of the voice input matches with a first set of sound fragments of a voice command; and
   if the first set of sound fragments matches with the set of sound fragments of the voice command, then forwarding the voice input to the second processing system; and the second processing system comprising:
- a memory containing a second voice command recognition program; and
- a processor which, when executing the second voice command recognition program, performs an operation comprising:
  - receiving the voice input from the first processing system; and
  - determining whether one or more remaining sound fragments matches with one or more remaining sound fragments of the voice command.

15. The system of claim 14, wherein the number of sound fragments is reduced when the load of the first processing system exceeds a predefined threshold.

16. The system of claim 14, wherein the operation of the second processing system further comprises: if the one or more remaining sound fragments matches with the one or more remaining sound fragments of the voice command, then invoking an action for which the voice command is configured.

17. The system of claim 14, wherein determining whether one or more remaining sound fragments matches with one or more remaining sound fragments of the voice command comprises:
- retrieving a total number of sound fragments in the voice command; and
- determining the one or more remaining sound fragments from the total number of sound fragments in the voice command.

18. The system of claim 14, further comprising a database comprising a total number of sound fragments in each voice command; and wherein determining whether one or more remaining sound fragments matches with one or more remaining sound fragments of the voice command comprises:
- retrieving the total number of sound fragments from the database; and
- determining the one or more remaining sound fragments from the total number of sound fragments in the voice command.

* * * * *